United States Patent [19]

Nagashima et al.

[11] Patent Number: 4,683,576
[45] Date of Patent: Jul. 28, 1987

[54] OPTICAL PUMPING LASER SYSTEM

[75] Inventors: Akira Nagashima, Ibaragi; Osamu Sukegawa, Tokyo, both of Japan

[73] Assignees: Japan Atomic Energy Research Institute; NEC Corporation, both of Tokyo, Japan

[21] Appl. No.: 788,720

[22] Filed: Oct. 17, 1985

[30] Foreign Application Priority Data

Oct. 19, 1984 [JP] Japan .................................. 59-219873

[51] Int. Cl.[4] .............................................. H01S 3/08
[52] U.S. Cl. ........................................ 372/98; 372/99
[58] Field of Search ....................... 372/98, 108, 92, 99

[56] References Cited

PUBLICATIONS

Walter Leeb, "Losses Introduced by Tilting Intercavity Etalons", Applied Physics, 1975, pp. 267–272.
IEEE Journal of Quantum Electronics, vol. QE-16, No. 5, May 1980, "Pulsed FIR Emission from Isotonic Methyl Fluoride", by W. A. Peebles et al.

Primary Examiner—Gene Wan
Attorney, Agent, or Firm—Burns, Doane, Swecker & Mathis

[57] ABSTRACT

An optical pumping laser system is provided with a resonator suitable for a continuous oscillation having a relatively low gain. The laser system comprises an optical plate such as an etalon plate functioning as a Brewster plate with respect to a pumping beam and also functioning as a reflection mirror with respect to an oscillation laser beam, and a total reflection mirror spaced apart from the optical element so as to define a laser amplification region. The laser system further comprises an output mirror arranged relative to the optical plate to output the oscillation laser beam separated from the pumping beam by the optical element functioning as the reflection mirror. Thus, this laser system provides a uniform pumping of a laser medium having a relatively large cross-section, thus providing improved excitation efficiency and mode quality. Further, this laser system is configured such that the output mirror is not substantially exposed to the pumping beam, thus providing increased output power and improved stability of the entire system.

6 Claims, 4 Drawing Figures

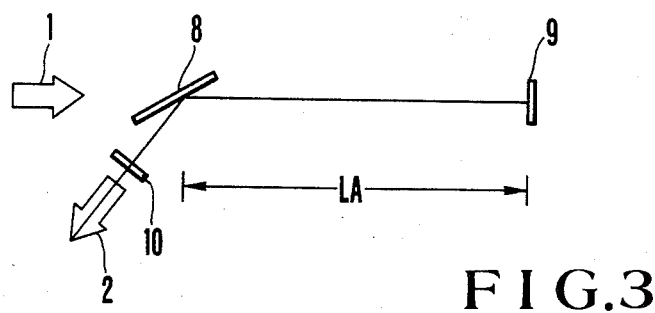
F I G. 3

OPTICAL PUMPING LASER SYSTEM

BACKGROUND OF THE INVENTION

The present invention relates to an optical pumping laser with a resonator.

Referring to FIG. 1, there is shown a typical optical pumping laser system comprising an apertured input mirror 3 and an output mirror 4 spaced apart from the input mirror 3. A pumping beam 1 is produced from a pumping laser (not shown). In this arrangement, the pumping beam 1 and an oscillation laser beam 2 exist coaxially with each other. The laser system shown in FIG. 1 is of guite simplified construction, but its drawbacks are as follows: First, (i) since the pumping beam 1 is focused and injected into the system through an aperture provided in the input mirror 3, it is difficult to provide a uniform excitation of a laser medium having a large cross-section, with the result that the excitation efficiency of the laser and the mode quality are degraded. Further, (ii) since the output mirror 4 not only functions as means for outputting the oscillation laser beam 2 but also functions as a reflection mirror for the pumping beam 1, care must be taken especially with respect to the output mirror 4. Even if such a measure is taken, laser loss or loss of pumping beam is not avoidable. In addition, (iii) when the output mirror 4 is moved for frequency tuning, the condition of the pumping beam returning from the output mirror 4 to the pumping laser varies, thus providing disturbance in the pumping beam, resulting in degraded stability of the entire laser system.

To overcome these drawbacks, a resonator configured as shown in FIG. 2 has been proposed and put into practice (For instance IEEE. J. of Q.E, 1980, QE-16, p 505). In this laser resonator, a Brewster plate 5 and a reflection mirror 6 are used instead of the input mirror 3, and an output mirror 4 is used, wherein a laser amplification region LA is formed between the Brewster plate 5 and the output mirror 4. However, this system utilizes only a surface reflection on the Brewster plate 5 to constitute the laser resonator, with the result that laser loss is large and only pulse oscillation having a high gain is possible. In other words, with this system, a continuous oscillation having a low gain cannot be realized. Further, because of the large optical loss of this Brewster plate 5 for the oscillation laser beam, the oscillation laser beam is outputted from the output mirror 4, which is located far from the Brewster plate 5. Then, the output mirror 4 is hit by the pumping beam 1. So, the system shown in FIG. 2 cannot still overcome the drawbacks, described in the above items (ii) and (iii), of the first-mentioned system. This is a serious problem particularly in the continuous oscillation.

SUMMARY OF THE INVENTION

With the above in mind, an object of the present invention is to provide a laser resonator which has eliminated drawbacks of the prior arts.

Another object of the present invention is to provide a laser resonator provided with a Brewster plate having low reflection loss, thus making it possible to provide an output beam from a portion which is not exposed to an excitation beam.

According to the present invention, there is provided an optical pumping laser system comprising an optical element functioning as a Brewster plate with respect to a pumping beam and functioning as a reflection mirror with respect to an oscillation laser beam, a total reflection mirror spaced apart from the optical element so as to define a laser amplification region, and an output mirror arranged relative to the optical element to output the oscillation laser beam separated from the pumping beam on the basis of reflection by the optical element functioning as the reflection mirror.

BRIEF DESCRIPTION OF THE DRAWINGS

The features and advantages of an optical pumping laser system according to the present invention will become more apparent from the following description taken in conjunction with the accompanying drawings, in which:

FIG. 3 is a schematic view illustrating an embodiment of an optical pumping laser with a resonator according to the present invention.

DESCRIPTION OF THE PREFERRED EMBODIMENT

Figure 1:
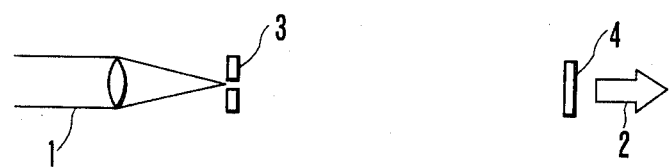
FIGS. 1 and 2 are schematic views illustrating conventional optical pumping lasers with resonators.
Figure 2:
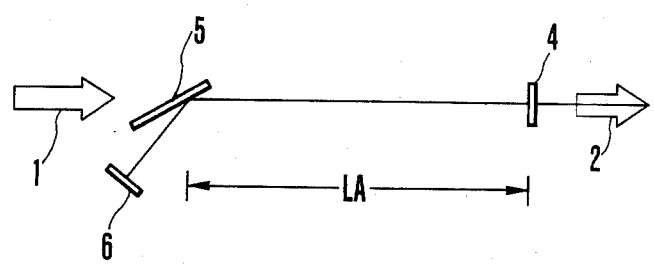

Referring to FIG. 3, there is shown an embodiment of a laser resonator according to the present invention.

The laser resonator comprises an optical element 8 functioning as a Brewster plate with respect to a pumping beam 1 and functioning as a reflection mirror with respect to an oscillation laser beam, a total reflection mirror 9 spaced apart from the optical element so as to define a laser amplification region LA, and an output mirror 10 arranged relative to the optical element to output the oscillation laser beam separated from the pumping beam on the basis of the reflection by the optical element 8 functioning as the reflection mirror.

More particularly, the optical element 8 comprised of an etalon plate is disposed in an incident direction of the pumping beam 1. The etalon plate 8 is arranged so as to present a Brewster angle with respect to the pumping beam 1 and functions as an element allowing the pumping beam 1 to be transmitted therethrough. Further, the etalon plate 8 has a thickness adjusted by polishing so that reflectivity is maximum at the incident angle with respect to the wavelength of the oscillation laser. With the arrangement thus configured, the pumping beam 1 is reflected by the total reflection mirror 9 and is returned to the etalon plate 8 along an optical path through which the pumping beam 1 propagates toward the reflection mirror 9. The oscillation laser beam 2 is separated from the pumping beam by the etalon plate 8 functioning as the reflection mirror. Accordingly, the laser output mirror 10 is not exposed to the pumping beam, thus overcoming the above-mentioned drawbacks described in the above items (ii) and (iii).

Figure 4:
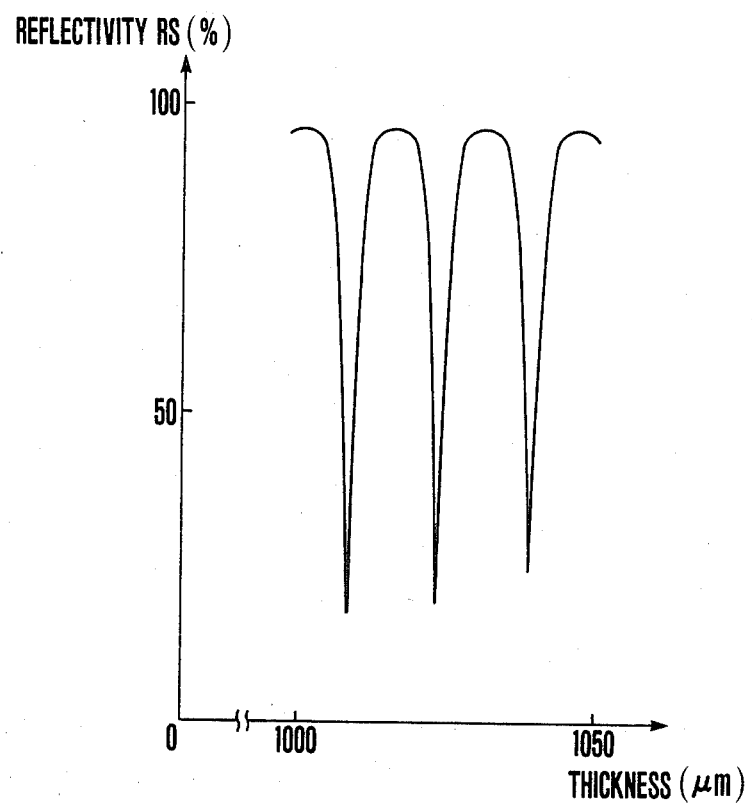
FIG. 4 is a graph showing thickness dependency of an etalon plate of Ge used in the present invention where a laser beam has a wavelength of 118.8 micron.

The key point of the embodiment is to produce an etalon plate having a low optical loss. When a laser of $CH_3OH$ (methanol) having a wavelength of 118.8 micron which is the most effective as an optical pumping laser is employed, such an etalon plate having a high optical gain can be produced as follows. To oscillate the laser beam, a $CO_2$ (carbon dioxide) laser having a laser beam of 9.7 micron in wavelength is employed. The material of the etalon plate must satisfy the following requirements. First is to have a less absorption with respect to the pumping beam having the wavelength of 9.7 micron. Second is that reflectivity for the wavelength 118.8 micron is large at Brewster's angle where the wavelength of the pumping beam is 9.7 micron. To satisfy these conditions, Ge (germanium) is the most suitable. When a beam having the wavelength of 118.8 micron is incident to a parallel plate of Ge at Brewster's angle where the wavelength of the pumping beam is 9.7 micron, thickness dependency of the reflectivity is shown in FIG. 4. In view of this characteristic, a process is implemented to polish Ge so that its thickness is 1017 ±2 micron, thus providing an etalon plate having a reflectivity more than 95%. This etalon plate has an extremely high reflectivity as compared with an ordinary (surface) reflection of 77%. With such an etalon plate, it is possible to provide a continuous oscillation at the wavelength of 118.8 micron and to realize separation between pumping beam and laser beam at an output reflection mirror.

In the above-mentioned embodiment, the etalon plate is used as an optical element for providing high reflectivity. However, the present invention may be realized without using such an etalon plate. It is to be noted that the following implementations would be included within the scope of the present invention. For instance, although depending upon wavelength used, high reflectivity can be realized by utilizing surface reflection of an optical element other than the etalon plate. In addition, an optical plate on which coating treatment is applied may be used for the same purpose.

An optical pumping laser system according to the present invention is configured to use an etalon plate having a low optical loss to realize separation between the pumping beam and the laser beam, thus providing the following advantages. (i) It is unnecessary to focus the pumping beam into a limited area (e.g. the aperture provided in the input mirror). Accordingly, this makes it possible to provide a uniform pumping of a laser medium having a relatively large cross-section, thus improving excitation efficiency and mode quality. (ii) Since the optical system is configured such that the output mirror is not exposed to the pumping beam, making it easy to optimize the output mirror, resulting in enhanced output power. (iii) For the same reason as stated in the item (ii), the movement of the output mirror relative to the etalon plate does not affect returning of the pumping beam, thus providing improved stability of the entire system.

What is claimed is:

1. An optical pumping laser system comprising:
   an optical element functioning as a Brewster plate with respect to a pumping beam and functioning as a reflection mirror with respect to an oscillation laser beam;
   a total reflection mirror spaced apart from said optical element and located on an axis of the pumping beam with the optical element disposed between the total reflection mirror and a pumping beam source; and
   a partially reflecting mirror for outputting the oscillation laser beam, the partially reflecting mirrors being disposed off the axis of the pumping beam and arranged relative to said optical element and to said total reflection mirror to constitute a laser cavity for the oscillation laser beam with said optical element functioning as a tilted reflector 2. An optical pumping laser system as set forth in claim 1, wherein said optical pumping laser system is constituted by a laser of $CH_3OH$ having a wavelength of 118.8 micron.

3. An optical pumping laser system as set forth in claim 2, wherein a laser beam having a wavelength of 9.7 micron produced from a $CO_2$ laser is used as said pumping beam.

4. An optical pumping laser system as set forth in claim 1 or 3, wherein said optical element is comprised of an etalon plate.

5. An optical pumping laser system as set forth in claim 4, wherein said etalon plate is configured by polishing a Ge plate so as to provide a suitable thickness.

6. An optical pumping laser system as set forth in claim 5, wherein said etalon plate has a reflectivity of more than 95%.

* * * * *